United States Patent
El Haloui

(10) Patent No.: US 10,717,545 B2
(45) Date of Patent: Jul. 21, 2020

(54) PROPELLER HEALTH MONITORING

(71) Applicant: Ratier-Figeac SAS, Figeac (FR)

(72) Inventor: Abdellah El Haloui, Figeac (FR)

(73) Assignee: RATIER-FIGEAC SAS, Figeac (FR)

( * ) Notice: Subject to any disclaimer, the term of this patent is extended or adjusted under 35 U.S.C. 154(b) by 85 days.

(21) Appl. No.: 15/698,805

(22) Filed: Sep. 8, 2017

(65) Prior Publication Data

US 2018/0079522 A1 Mar. 22, 2018

(30) Foreign Application Priority Data

Sep. 16, 2016 (EP) .................................... 16306183

(51) Int. Cl.
| | |
|---|---|
| *B64D 45/00* | (2006.01) |
| *B64C 11/30* | (2006.01) |
| *F01D 7/00* | (2006.01) |
| *G07C 5/08* | (2006.01) |

(52) U.S. Cl.
CPC .............. *B64D 45/00* (2013.01); *B64C 11/30* (2013.01); *F01D 7/00* (2013.01); *G07C 5/0816* (2013.01); *B64D 2045/0085* (2013.01); *F05D 2260/80* (2013.01); *Y02T 50/671* (2013.01)

(58) Field of Classification Search
CPC . B64D 45/00; B64D 2045/0085; B64C 11/30; F01D 7/00; G07C 5/0816; F05D 2260/80; Y02T 50/671
USPC ...................................................... 701/34.2
See application file for complete search history.

(56) References Cited

U.S. PATENT DOCUMENTS

| | | | | |
|---|---|---|---|---|
| 5,779,446 | A | * | 7/1998 | Althof ...................... F01D 7/00 416/162 |
| 6,371,038 | B1 | * | 4/2002 | Beauchamp ........... B63H 25/46 114/151 |
| 8,532,939 | B2 | | 9/2013 | Bhattacharya |
| 2008/0183403 | A1 | | 7/2008 | Cipra |
| 2011/0020122 | A1 | | 1/2011 | Parthasarathy et al. |
| 2012/0045330 | A1 | | 2/2012 | Wu |

(Continued)

FOREIGN PATENT DOCUMENTS

| | | | | |
|---|---|---|---|---|
| GB | | 2175652 A | 12/1986 | |
| GB | | 2 182 727 A | * 5/1987 | ............. B64C 11/34 |
| GB | | 2182727 A | 5/1987 | |

OTHER PUBLICATIONS

European Search Report for Application No. 16306183.1-1610, dated Feb. 22, 2017, 7 pages.

*Primary Examiner* — Aaron L Troost
*Assistant Examiner* — Paula L Schneider
(74) *Attorney, Agent, or Firm* — Cantor Colburn LLP

(57) ABSTRACT

A method for monitoring the health of propellers in an aircraft is provided. The method includes receiving a first propeller pitch angle of a first propeller of an aircraft; calculating a first residual pitch angle which is the difference between the first propeller pitch angle and a second propeller pitch angle; and comparing the first residual pitch angle to at least one threshold. The at least one threshold may include upper and lower thresholds. It is established that the health of the propeller may be impaired if the residual pitch angle is outside the at least one threshold, for example it exceeds the upper threshold or is below the lower threshold. If it is established that the health of the propeller may be impaired, an alert is made for inspection and maintenance to take place.

20 Claims, 7 Drawing Sheets

(56) References Cited

U.S. PATENT DOCUMENTS

| | | | |
|---|---|---|---|
| 2013/0025352 A1* | 1/2013 | Teres Teres | F03D 7/0224 73/112.01 |
| 2015/0086360 A1* | 3/2015 | Hammerum | F03D 7/0264 416/1 |
| 2015/0285753 A1 | 10/2015 | Jakielski | |
| 2017/0315020 A1* | 11/2017 | Seminel | G01H 1/003 |

* cited by examiner

PROPELLER HEALTH MONITORING

FOREIGN PRIORITY

This application claims priority to European Patent Application No. 16306183.1 filed Sep. 16, 2016, the entire contents of which is incorporated herein by reference.

TECHNICAL FIELD

This disclosure relates to the technical area of health monitoring of vehicle engine propellers, in particular in aircraft, for providing a warning or an indication that maintenance is required. In particular, the field of the disclosure lies in the area of aircraft engine propellers.

BACKGROUND OF THE DISCLOSURE

It is generally known in the art, for example, as disclosed in both US 2011/0020122 A1 and US 2008/0183403 A1, to monitor the health of structural members in systems.

In particular, it is known in the art to monitor the health of fan blades to assess if maintenance work needs to be carried out. This prevents unnecessary maintenance checks being undertaken and also provides earlier warnings of damage than routine checks.

Most known methods analyse each blade individually for damage. For example, U.S. Pat. No. 8,532,939 B2 discloses a system which measures the time of arrival of each blade of a fan at a certain position around the path of travel of the blade, and compares this with expected times of arrival of each blade. From the discrepancy between these, the system calculates the blade resonant frequencies and a comparison can be made to those of a "healthy blade", to determine if there is blade damage.

A similar system is disclosed by US 2015/0285753 A1, which describes an array of magnetic fields for determining blade tip positional data. This data is used to calculate a measured blade vibrational frequency which is compared to an expected vibrational frequency to determine if a particular blade has incurred damage.

Similarly, US 2012/0045330 A1 teaches illuminating a wind turbine with a light source, building a 3-dimensional image of the wind turbine using backscattered light pulses and comparing this image with another to determine from the deviations if the health of the wind turbine has been compromised.

The present disclosure aims to provide an alternative and simple real-time health monitoring system for one or more propellers.

SUMMARY OF THE DISCLOSURE

According to a first aspect of the disclosure, there is provided a method for monitoring aircraft propeller health comprising: receiving a first propeller pitch angle of a first propeller of an aircraft; calculating a first residual pitch angle which is the difference between the first propeller pitch angle and a second propeller pitch angle; and comparing the first residual pitch angle to at least one threshold.

The at least one threshold may include upper and lower thresholds.

The method may further comprise establishing that the health of the propeller may be impaired if the residual pitch angle is outside the at least one threshold. The method may comprise establishing that the health of the propeller may be impaired if the residual pitch angle above the at least one threshold.

The method may further comprise establishing that the health of the propeller may be impaired if the residual pitch angle exceeds the upper threshold or is below the lower threshold.

The method may further comprise indicating an alert for maintenance if it is established that the health of the propeller may be impaired.

The second propeller pitch angle may be a pitch angle of a second propeller of the aircraft. The method may further comprise receiving the second propeller pitch angle.

The second propeller pitch angle may be a predicted pitch angle generated by a computer model. The method may further comprise receiving the second propeller pitch angle.

The method may further comprise: receiving a third propeller pitch angle of a second propeller of the aircraft; calculating a second residual pitch angle which is the difference between the first and third propeller pitch angles; and comparing the second residual pitch angle to at least one threshold. The method may comprise comparing the second residual pitch angle to upper and lower thresholds.

The at least one threshold for the residual pitch angle may be between 0.1° to 5°, optionally between 0.2° to 2°. The at least one threshold for the residual pitch angle may be between 0.3° to 1°. The at least one threshold for the residual pitch angle may be 0.5°.

The upper and lower thresholds for the residual pitch angle may be between +0.1° to +5° and between −0.1° to −5° respectively. The upper and lower thresholds for the residual pitch angle may be between +0.2° to +2° and between −0.2° to −2° respectively. The upper and lower thresholds for the residual pitch angle may be between +0.3° to +1° and between −0.3° to −1° respectively. The upper and lower thresholds for the residual pitch angle may be +0.5° and −0.5° respectively.

The method may further comprise: receiving propeller pitch angles of further propellers of the same aircraft; calculating further residual pitch angles which are the difference between pairs of propeller pitch angles; comparing the further residual pitch angles to the upper and lower thresholds; and establishing that the health of a propeller may be impaired if multiple residual pitch angles are outside of a range defined between the lower and upper thresholds, said residual pitch angles having been calculated using data from one or more common propellers.

The method may further comprise indicating an alert for maintenance if it is established that the health of a propeller may be impaired.

According to a second aspect of the disclosure, there is provided an apparatus configured to perform a method for monitoring aircraft propeller health according to the first aspect.

According to a third aspect of the disclosure, there is provided an apparatus comprising a processor arranged to carry out the method according to the first aspect.

The processor may be integrated into the FADEC. The apparatus may further comprise a propeller blade pitch angle detector.

BRIEF DESCRIPTION OF THE FIGURES

Preferred embodiments of the present disclosure will now be described by way of example only and with reference to the accompanying drawings, in which.

DETAILED DESCRIPTION

A first embodiment of the present disclosure of a real-time fault detection and isolation algorithm can be best described with reference to FIGS. 1 and 2. Data relating to the pitch angle of aircraft propeller blades is conventionally collected by an aircraft. This may for example be through the use of a magnetic pickup and metallic target system and supplied to an electronic control system. For example, as the propeller rotates, metallic targets on the propeller blades pass through a magnetic field generated by the pickups and generate an electrical pulse train that can be measured by the control unit. This pulse train comprises data which, when properly calibrated, comprises meaningful data of the angle of pitch of blades on the propeller. Other means for collecting the pitch angle data include using a Linear Variable Differential Transformer, LVDT or using a Rotary Variable Differential Transformer, RVDT.

Figure 1:
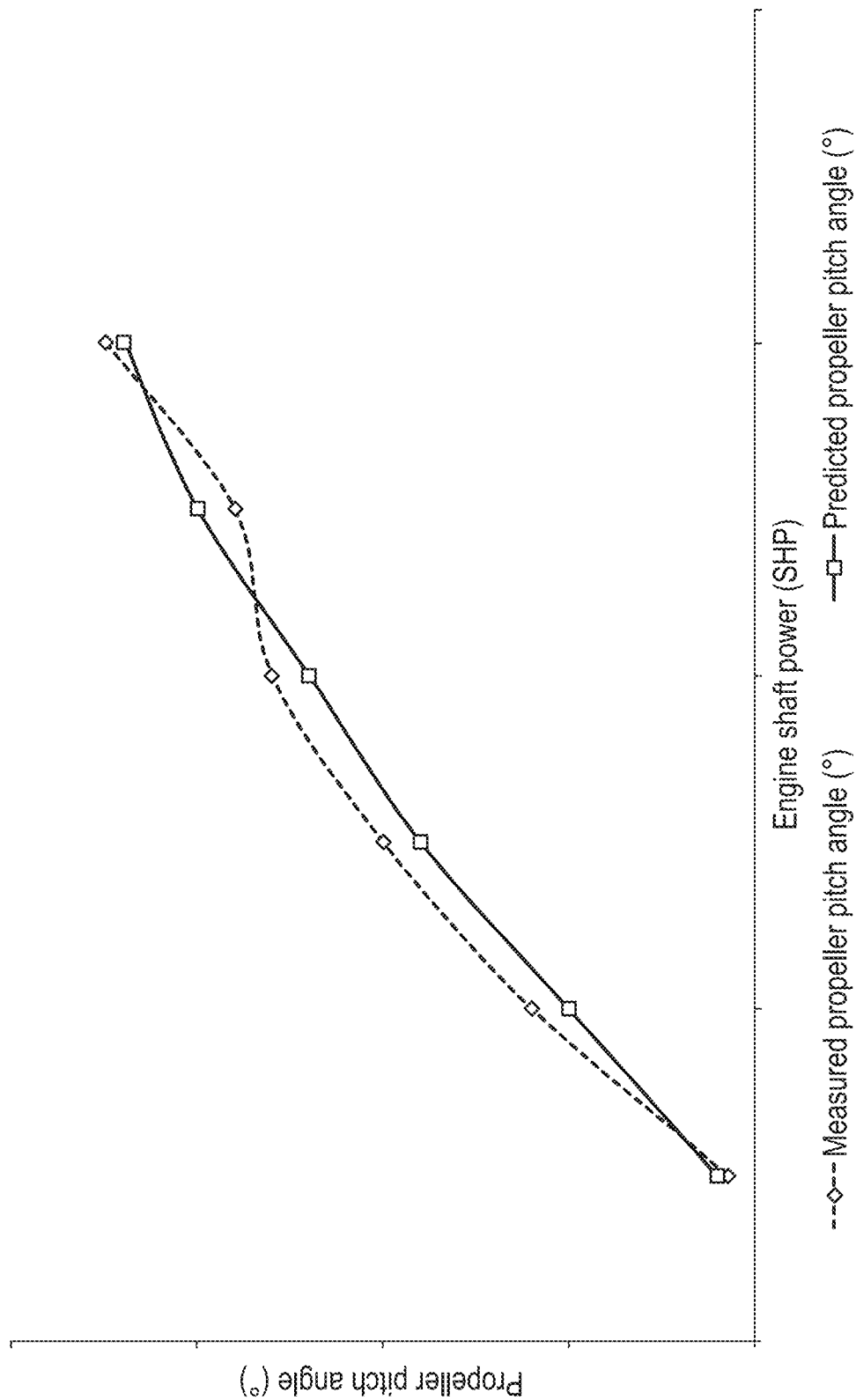
FIG. 1 shows a schematic graph depicting each of a measured propeller pitch angle and a predicted propeller pitch angle over a range of shaft horsepower (SHP) of an aircraft engine.

As can be seen from FIG. 1, the angle of pitch of propeller blades varies depending on the shaft horsepower of the engine. FIG. 1 shows how a measured propeller pitch angle 10 varies depending on the shaft horsepower of an aircraft engine. By "pitch angle" or "pitch angle data" of a propeller, what is meant is an average pitch angle, or data representing the average pitch angle (rotation about a longitudinal axis of a blade) of the blades on a propeller. The pitch angle of a propeller will also fluctuate with time, due to operating conditions (such as the engine shaft horsepower) and due to damage.

Occasionally, damage to a propeller can occur, i.e. the health of the propeller may be impaired. This can be due, for example, to high loading during abnormal propeller operations, adverse weather conditions, bird strike or the like. The result of this damage is degradation of the impacted blade, which effectively causes a change of shape of the blade. This change of shape affects the proportion of the engine driving torque which is reacted by the blade. Depending on the type of damage, the proportion of engine driving torque which is reacted by the blade may increase or decrease. Consequently, since the engine driving torque is maintained at a constant value, the propeller control changes the pitch angle of all of the propeller blades on the propeller, in order to maintain constant speed of rotation of the propeller. Thus, the change in the amount of torque reacted by the degraded blade is compensated by changing the pitch angle of all of the blades. Accordingly, the average blade pitch across the entire propeller will be altered and this can be measured.

Also shown in the graph of FIG. 1 is predicted propeller pitch angle data 20. This predetermined data, which is either calculated by a computer model or is stored propeller data for a healthy (i.e. undamaged) propeller, is based on a healthy propeller at specific flight and operation conditions. Where the conditions of the aircraft match those of the predetermined model data, then it is to be expected that unless the propeller is damaged, the two data sets should be relatively closely aligned. This can be seen in FIG. 1, where the two data sets 10 and 20 are closely aligned.

Figure 2:
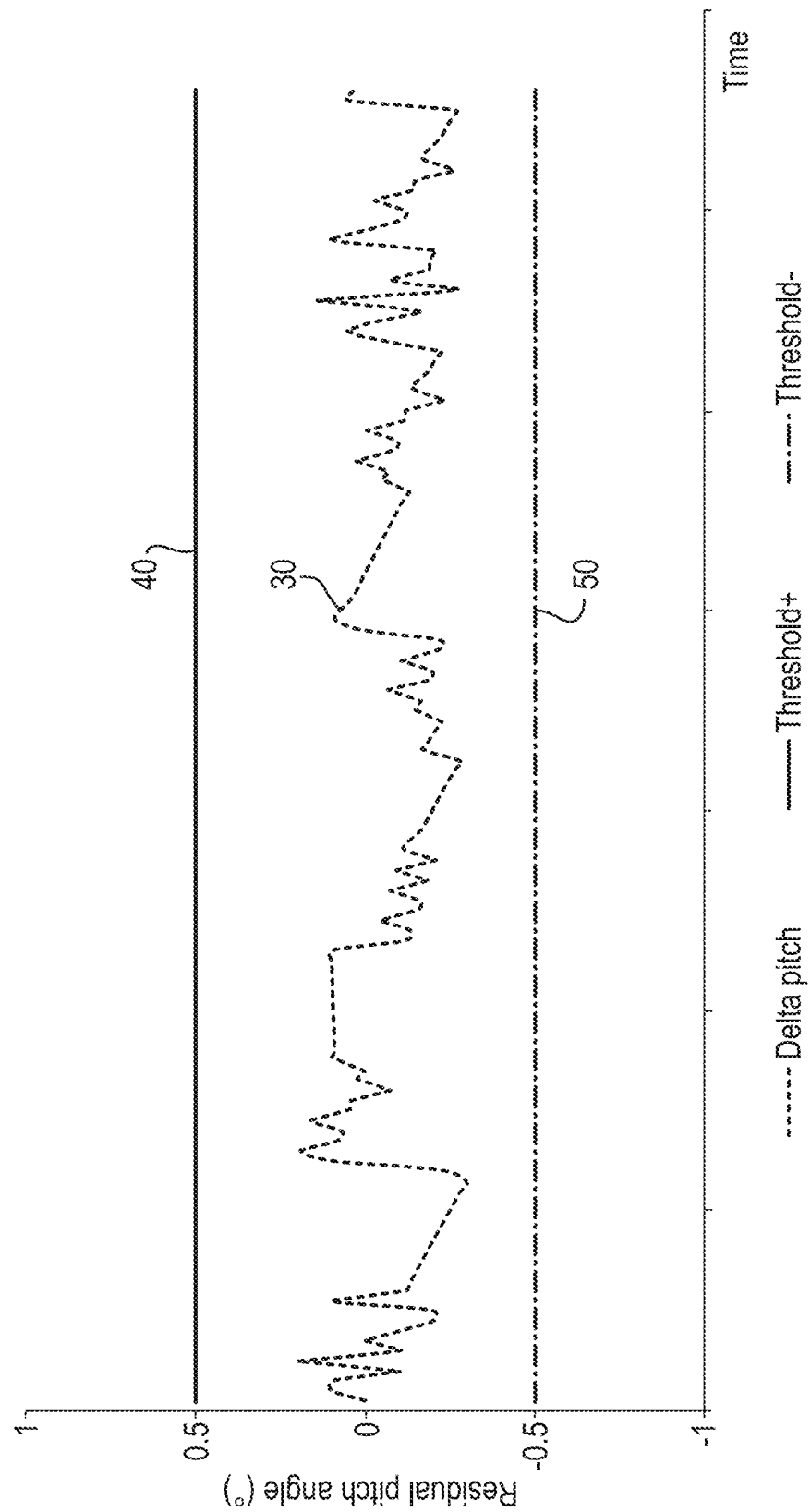
FIG. 2 shows a residual pitch angle over time for a propeller, as well as upper and lower residual pitch angle thresholds.

Thus a comparison can be made between the measured pitch angle data 10 and the predetermined pitch angle data 20 at several points in time and this is shown in FIG. 2. As can be seen, the graph depicts residual pitch angle data 30. The residual pitch angle at a particular point in time is calculated by subtracting one of the measured or predetermined pitch angles from the other, i.e. by finding the difference between the predicted or predetermined pitch angle 20 for a healthy propeller and the actual measured pitch angle 10 from the propeller. By calculating this for a number of points in time, a residual pitch angle dataset 30 (also indicated as "Delta pitch") can be obtained and plotted as in FIG. 2.

The present inventor has recognised that the health of a propeller can be assessed by comparing the residual pitch angle with a threshold. As described above, depending on the particular damage to a blade or blades of a propeller, the pitch angle of the propeller blades as compensated by the controller may be increased or decreased. Accordingly, it is necessary to set both a predetermined upper threshold 40 and a predetermined lower threshold 50 for the residual pitch angle data, as shown in FIG. 2.

The predetermined upper and lower thresholds may be +0.5° and −0.5° respectively as shown in the Figures. However the skilled person would also be able to clearly understand that other suitable thresholds may be used depending on the circumstances. For example, the upper and lower thresholds may be between +0.1° to +5° and between −0.1° to −5° respectively, optionally between +0.2° to +2° and between −0.2° to −2° respectively, further optionally between +0.3° to +1° and between −0.3° to −1° respectively. In embodiments, the upper and lower thresholds may have the same numerical value, for example, they may be +0.4° and −0.4° respectively, +0.5° and −0.5° respectively or +0.6° and −0.6° respectively.

If the calculated residual pitch angle exceeds the predetermined upper threshold (i.e. the residual pitch angle data curve 30 as shown in FIG. 2 extends at any point above the upper threshold 40), then according to the disclosure it is concluded that the propeller may be (or has been) damaged, i.e. the health of the propeller may be impaired, because the pitch of the propeller is significantly outside of an expected healthy propeller pitch range. Alternatively and/or additionally, if the calculated residual pitch angle reduces below the predetermined lower threshold (i.e. the residual pitch angle data curve 30 as shown in FIG. 2 extends at any point below the lower threshold 50), then it is concluded that the propeller may be (or has been) damaged, i.e. the health of the propeller may be impaired, because the pitch angle of the propeller is significantly outside of an expected healthy propeller pitch range.

If a propeller has a residual pitch angle beyond the predetermined thresholds, a control unit (not shown) is arranged to generate a maintenance alert to notify personnel that the propeller should be inspected, to assess the extent of the damage and to carry out any necessary repairs.

The above method can be carried out in real-time throughout propeller operation for each of the propellers of an aircraft and can thus ensure that inspection and maintenance checks are scheduled when required and not unnecessarily. It also enables potential issues to be discovered as and when they occur, rather than awaiting the next maintenance check.

A full automation of the process could involve a computer and/or processing device, which may be integrated into the FADEC (Full Authority Digital Engine Control) of the aircraft, that automatically calculates or recovers the propeller's pitch angles and then automatically calculates the residual propeller pitch angle using propeller pitch angle data for the same operating conditions. The process may automatically provide reports describing the state of the propeller blades and/or alert the operator if necessary and/or send a message to notify personnel of the need for inspection and possible maintenance.

The method of the first embodiment is especially useful where the predetermined predicted propeller pitch angle data 20 is for a propeller at the same flight and operating conditions as the actual propeller at that point, or if propeller pitch angle data is easily predictable for the particular flight and operating conditions. However it may be the case that the aircraft is in different flight and operating conditions than those of the predicted data so such comparisons may not be particularly indicative of a damaged propeller, or that pitch angle data may not easily be predicted for the particular conditions. This has led to the development of a second embodiment of the disclosure as described below.

Figure 3:
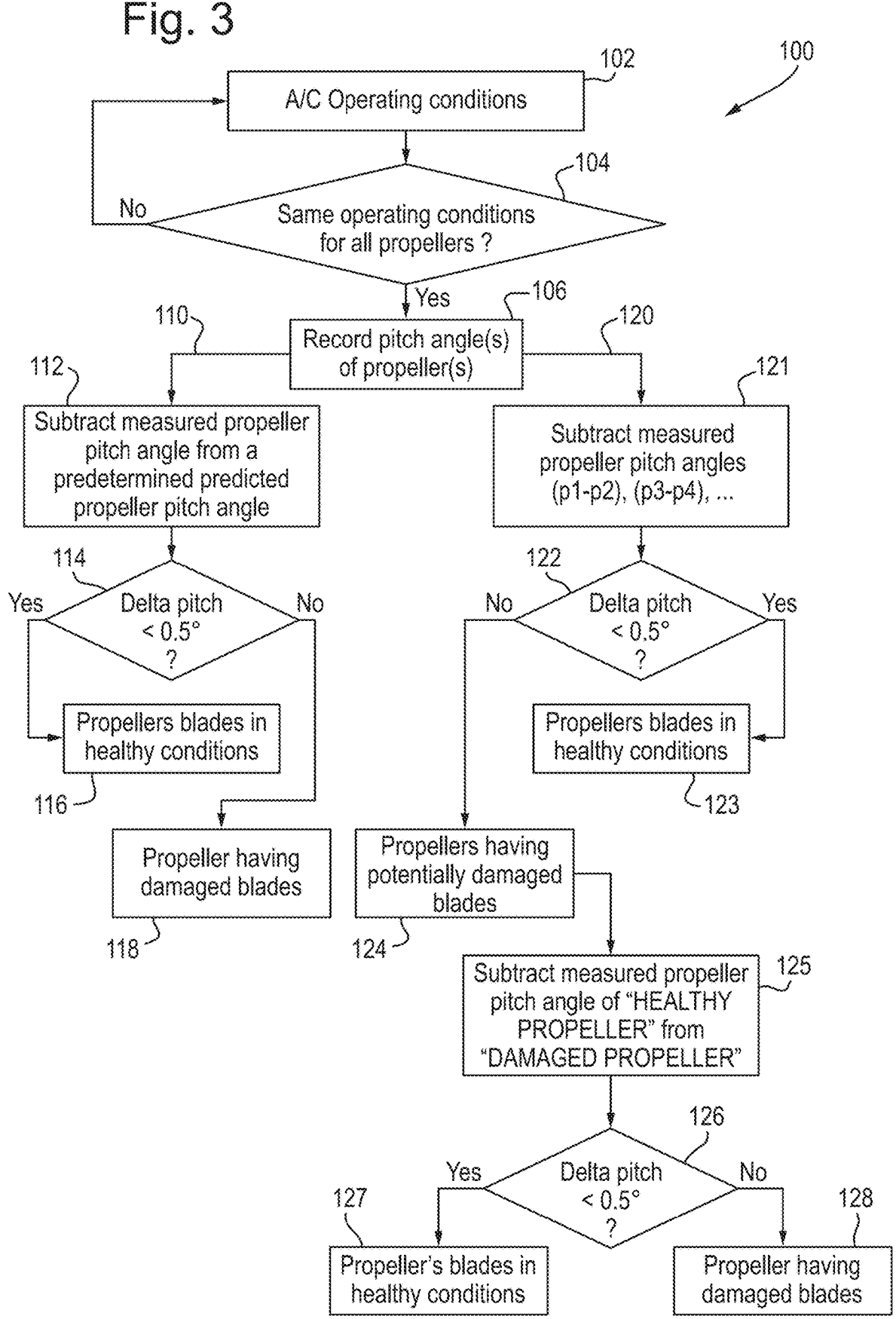
FIG. 3 shows schematically a method for detecting if a propeller is healthy or has been damaged.

FIG. 3 shows the above method of the first embodiment via branch 110 as well as a method of the second embodiment of the disclosure via branch 120. As seen in FIG. 3, a method for monitoring aircraft propeller health 100 implemented by a control unit begins with a step 102 of determining the particular operating conditions of the aircraft, i.e. checking for stabilised flight steady state conditions. This can include using aircraft parameters such as sideslip, roll, yaw, pitch, etc., as well as the engine shaft horsepower (SHP), the propeller rotational speed, etc. At step 104, the control unit confirms that the operating conditions identified in step 102 are the same for all propellers, i.e. that the flight conditions are stable. The method does not proceed to step 106 until this has been confirmed. At step 106, the pitch angle of the propellers is recorded, received for example from conventional pitch angle detection technology. This may be for one or more propellers, and optionally for all of the propellers. From step 106, the method divides into two separate branches, 110 and 120. It is contemplated that the method can include either branch 110 or 120, or that it can include both branches.

As explained above, the method following branch 110 is that described above for the first embodiment. It can be carried out for each individual propeller, optionally for each of multiple propellers and further optionally for each and every propeller of the aircraft. As can be seen at step 112, the difference between the measured pitch angle of the propeller and a predetermined predicted propeller pitch angle for a nominally healthy propeller under the same operating conditions is established. This is done by subtraction of one pitch angle from the other, resulting in a residual pitch angle ("delta pitch"). Next, at step 114, the residual pitch angle is compared with upper and lower thresholds. If the residual pitch angle falls between the upper and lower thresholds, then it is concluded that the propeller is healthy, i.e. has blades in a healthy condition, at step 116. Alternatively, if the residual pitch angle falls outside of the upper and lower thresholds, i.e. above the upper threshold or below the lower threshold, then it is concluded that the propeller may have or has damaged blades (i.e. that the health of the propeller may be impaired) at step 118.

Figure 4:
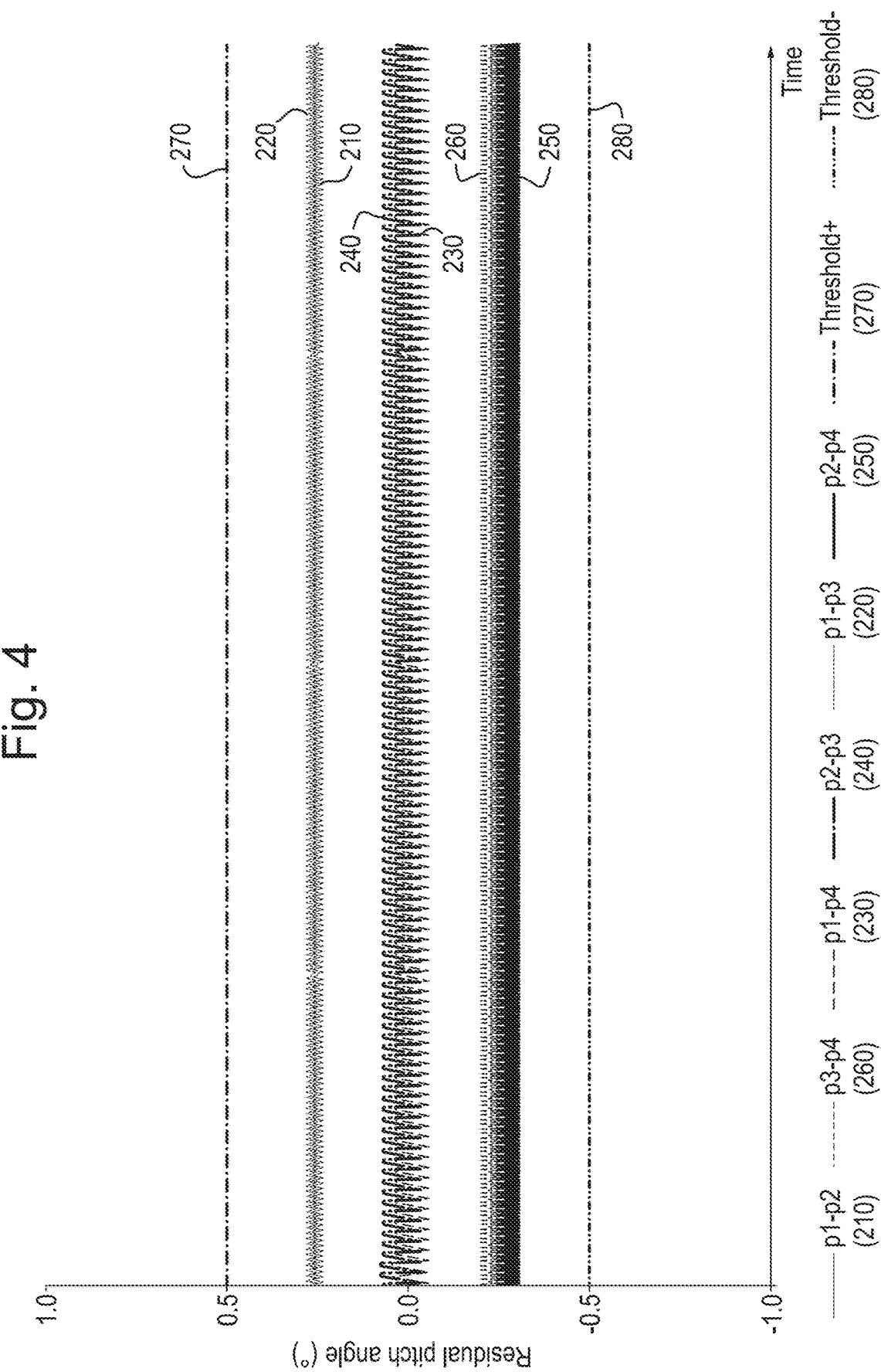
FIG. 4 shows experimental residual pitch angle data where all four propellers on an aircraft are in good condition.

The method following branch 120 is that of the second embodiment and is useful, for example, in cases where the operating conditions of the aircraft are not the same as or similar to those of the predetermined predicted model data, or where it is difficult to make predictions for the expected pitch angle of a healthy blade under the particular operating conditions. The method in branch 120 starts at step 121, by finding the difference between the measured pitch angles of different propellers. This is usually done by subtraction. For example, if there are four propellers P1, P2, P3, P4 having respective pitch angles p1, p2, p3 and p4, then the following six residual pitch angle combinations are possible: p1-p2; p1-p3; p1-p4; p2-p3; p2-p4; p3-p4. These are shown plotted over time on the graph of FIG. 4 as residual pitch angle data sets 210, 220, 230, 240, 250 and 260 respectively.

Returning to FIG. 3, at step 122, the residual pitch angle is compared with predetermined upper and lower thresholds. For the purposes of residual pitch angles, it is important to note that these thresholds may only be useful when the residual pitch angles arise from comparing propeller pitch angles from engines which are acting in a symmetric fashion, i.e. under symmetric operating conditions. For example, there may be both inboard and outboard engines, with the inboard engines arranged to have a different propeller blade pitch from the outboard engines. In this situation, pitch angle comparisons may only be made between propellers of the same type of engine, i.e. inboard or outboard engines. If this were not the case, then a relatively large, but normal, residual pitch angle would be seen between two healthy propellers which are located in inboard and outboard engines respectively. This residual pitch angle may exceed the defined threshold and thus it is beneficial to compare only propellers from the same type of engine to calculate residual pitch angles.

For a nominal upper threshold of 0.5° and a nominal lower threshold of −0.5° (as shown by lines 270 and 280 in FIG. 4), it is clear that the residual pitch angles (as shown by the residual data sets 210-260) fall within the thresholds. In such a case, the method of FIG. 3 moves to step 123, whereby it is concluded that all of the propellers are relatively healthy. The word "relatively" is used because with the residual pitch angle of branch 120 of the method, the blades are being compared to one another, rather than to an absolute value as is the case in branch 110 of the method.

Figure 7:
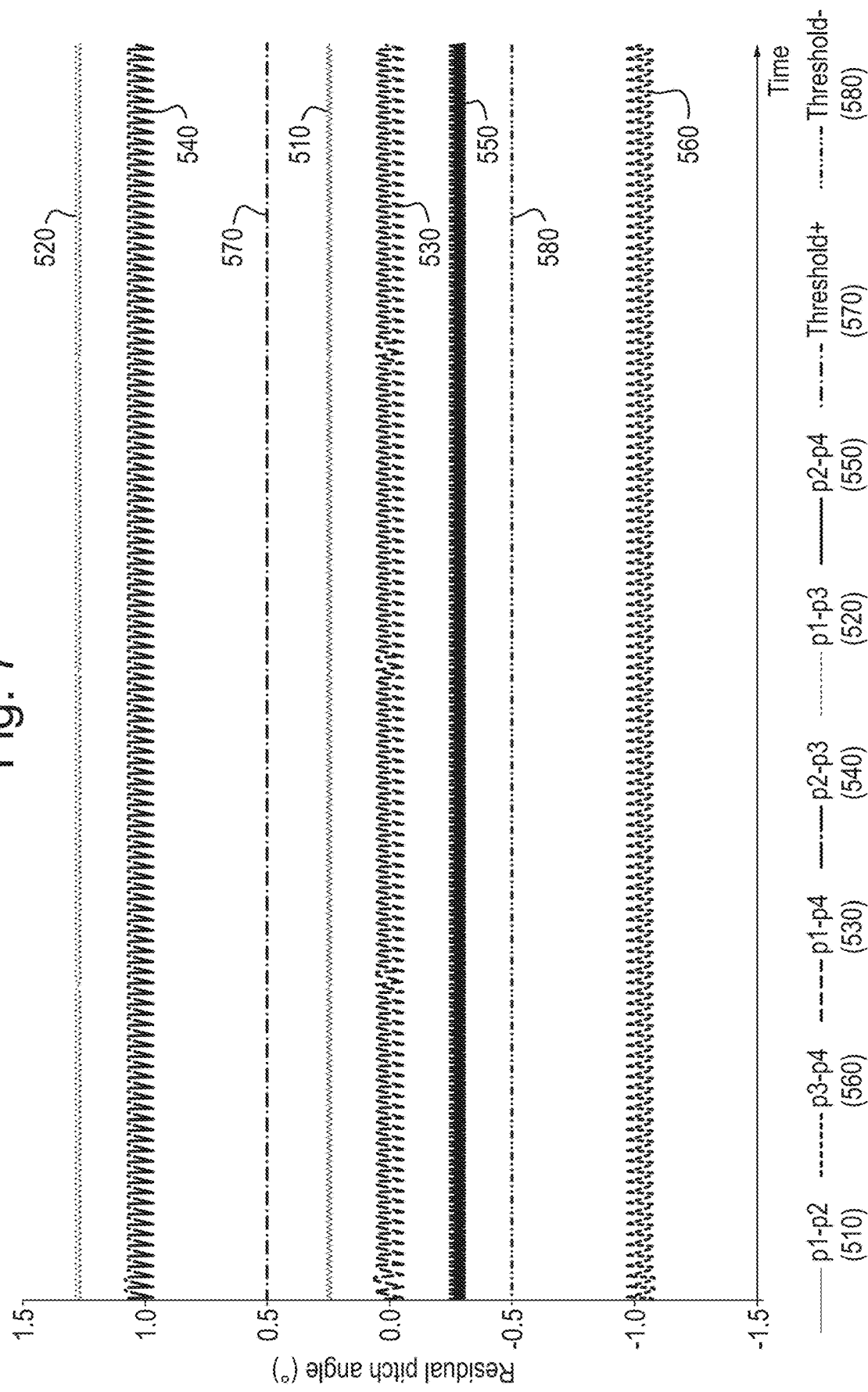
FIG. 7 shows schematically a graphical representation of the residual pitch angle for immediate determination of relatively damaged blades.

In some cases however, the residual pitch angle of the propellers can fall outside of the threshold. FIG. 7 depicts schematically the residual pitch angle data sets 510, 520, 530, 540, 550 and 560 (showing residual pitch angle over time) on a graph, where at least some of the residual pitch angles in residual pitch angle data sets 520, 540, 560 fall outside of the thresholds 570, 580. Accordingly, there is potentially a problem with at least one propeller, which is established at step 124 of the method 100 of FIG. 3.

In order to look into this potential damage further, more details of the origin of the particular residual pitch angles falling within and outside of the threshold limits are necessary. In the case shown in FIG. 7, the residual pitch angles in residual pitch angle data sets 520, 540 and 560 which fall outside the thresholds 570, 580 relate to propeller pitch angle comparisons p1-p3, p2-p3 and p3-p4 respectively. The residual pitch angles in residual pitch angle data sets 510, 530 and 550 within the thresholds 570, 580 relate to propeller pitch angle comparisons p1-p2, p1-p4 and p2-p4 respectively. Thus, it can be seen that the healthy propellers (at least relative to one another) which have residual pitch angles within the thresholds 570, 580 are propellers P1, P2 and P4. It can also be seen that any comparisons of propeller pitch angle which involve propeller P3 having a propeller pitch angle of p3 result in a significantly large residual pitch angle beyond the threshold limits 570, 580. Accordingly, the potentially damaged propeller can be identified as being P3.

Determination of which propellers are healthy and which are damaged may additionally be part of method step 124 of FIG. 3. However, it can help to optimize inspection time by carrying out the verification step 125 (discussed further below), since in many cases, this can help to pinpoint which of several propellers requires inspection. Thus, there is the possibility that in addition to comparisons being made between propellers using the above-described method of calculating a residual pitch angle to indicate the degree of similarity and/or difference between propellers, subsequent verification can also take place.

For example, if in step 124, a particular residual angle is found to fall outside of the threshold, it can be easily determined which two propellers provided the residual angle and thus one is potentially damaged. If no further analysis is carried out at this stage, then two propellers need to be inspected; however if verification is carried out, it may be discovered that only one propeller is damaged and thus only one inspection takes place. An alternative example is as discussed below in relation to FIG. 5, where not all of the possible residual pitch angles have been calculated initially. It may be necessary in the course of the analysis to calculate a further residual angle and so step 125 is required. Thus it is clear that although the method may stop at step 124, it can often be beneficial in reducing inspection time and costs to continue to step 125.

At method step 125, once it is clear which propeller(s) is/are potentially damaged, a residual pitch angle is calculated between the potentially damaged propeller and either predetermined predicted pitch angle data as in step 112 above (particularly if the correct flight conditions allow for it), or a propeller which is most probably a healthy propeller.

For propeller-propeller comparisons, if more than one propeller is deemed to be healthy, then the propeller having a blade pitch angle closest to a predicted value for a healthy propeller is used, as long as the predicted data is for the same operating conditions of the aircraft. Otherwise, residual pitch angles are calculated between the potentially damaged propeller and each of the more than one probably healthy propellers. Further, if there is more than one potentially unhealthy propeller, then step 125 is carried out for each of those potentially unhealthy propellers.

If at step 125 healthy and unhealthy propeller angles are being compared, this step may involve merely referring back to a previously calculated residual pitch angle, or, as will be described below with reference to FIGS. 5 and 6, may require a further residual pitch angle to be calculated.

Following this, at step 126, the residual pitch angle is compared with the predetermined upper and lower thresholds. If the residual pitch angle falls between the lower and upper thresholds, then at step 127, it is concluded that the propeller is healthy. Conversely, if the residual pitch angle is outside of the thresholds, i.e. above the upper threshold or below the lower threshold, then it is concluded at step 128 that the propeller is damaged (i.e. its health is impaired).

In both of branches 110 and 120 of the method, once it has been established by the system that a certain propeller is damaged (i.e. has at least one damaged blade and thus its health is impaired), the control unit will send an alert that inspection and potentially maintenance is required for that particular propeller.

Figure 5:
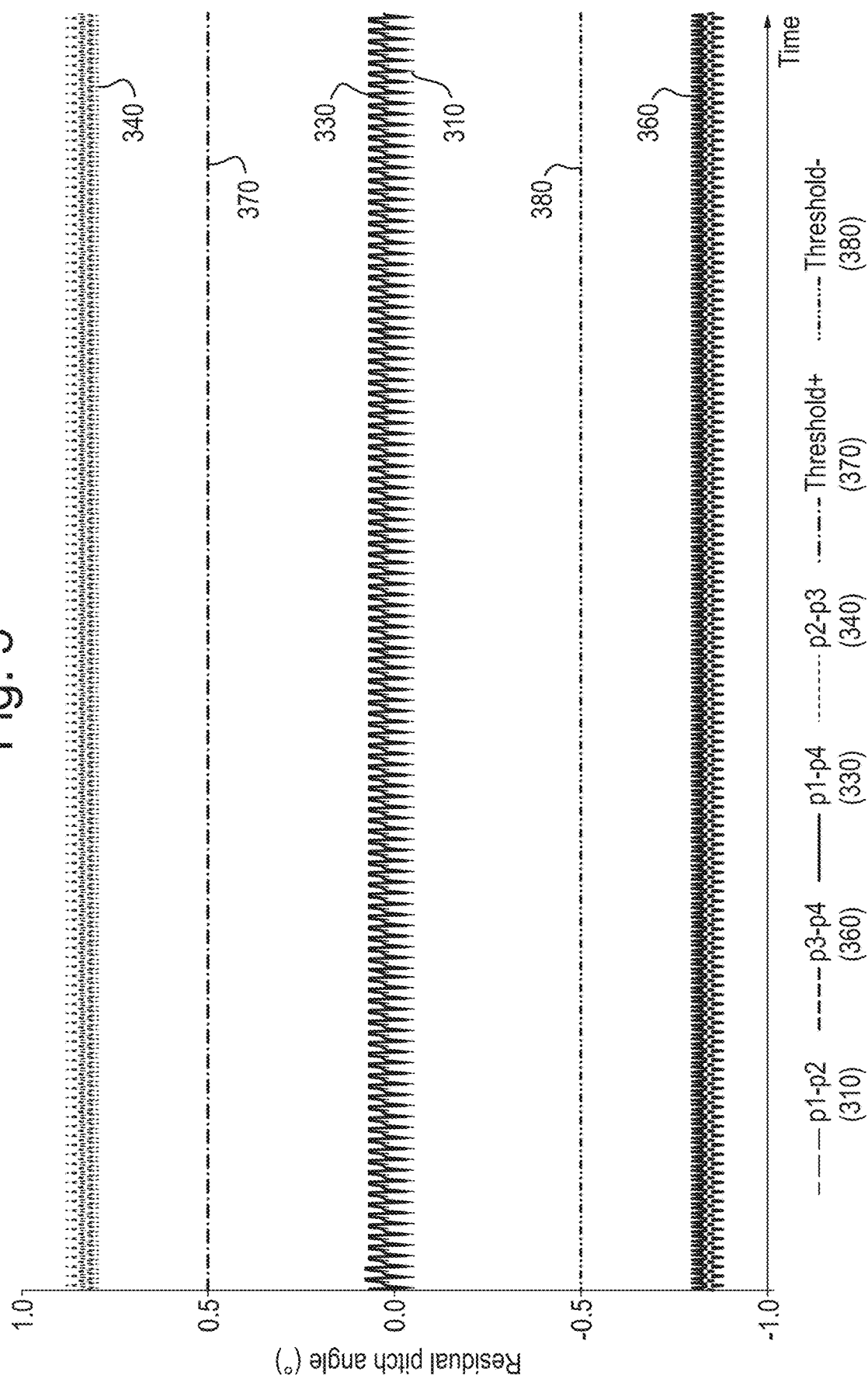
FIG. 5 shows experimental residual pitch angle data where three out of four propellers on an aircraft are in good condition and one propeller is damaged.

With reference to FIG. 5, as well as to the above description of method branch 120, one possible way to carry out propeller pitch angle comparisons is to minimise the calculations required, by making an incomplete set of comparisons. This may be beneficial in terms of time and capacity for data calculation and storage, especially if the method is operating in real-time. For example, as shown in FIG. 5, although there are four propellers P1, P2, P3 and P4 and so potentially six different pitch angle comparisons could be made, it may be desirable to reduce computation requirements by only making four pitch angle comparisons. In this case, in a step equivalent to step 121 of method 100 of FIG. 3, each propeller is compared to two others, thus residual pitch angle p1-p2 is depicted over time by residual pitch angle data set 310, residual pitch angle p1-p4 is depicted over time by residual pitch angle data set 330, residual pitch angle p2-p3 is depicted over time by residual pitch angle data set 340 and residual pitch angle p3-p4 is depicted over time by residual pitch angle data set 360. Upper threshold 370 and lower threshold 380 are also shown.

As can be seen, residual pitch angle data sets 310 and 330 are located very close to zero, implying that propellers P1 and P2 have extremely similar blade pitch angles, as do propellers P1 and P4. Thus it is likely that propellers P1, P2 and P4 are either healthy or, rather less likely but still possible (see the description relating to FIG. 6 below), that they have incurred very similar damage. Almost certainly, propeller P1 which is common to both healthy data sets is a healthy propeller. Conversely, as seen from residual pitch angle data sets 340 and 360, propellers P2 and P3 differ significantly in their propeller blade pitch angle, as do propellers P3 and P4. The common propeller which seems to be causing these data sets to diverge from the norm is propeller P3. Thus at step 124 of method 100 of FIG. 3, it would be concluded that propeller 3 potentially has damaged blades.

Consequently, since the potentially damaged propeller is P3 and the likely healthy propeller is P1, then at verification step 125 of method 100 of FIG. 3, a further pitch angle comparison of p1-p3 takes place. This is an extra pitch angle comparison which was not one of those being monitored in the reduced four-comparison method depicted in FIG. 5. The results of this pitch angle comparison can ascertain whether indeed propeller P3 is damaged. In the case shown in FIG. 5 which comprises real data, propellers P1, P2 and P4 were in good condition, while propeller P3 had one damaged blade. Thus the method has been shown to accurately pinpoint the damaged propeller.

Figure 6:
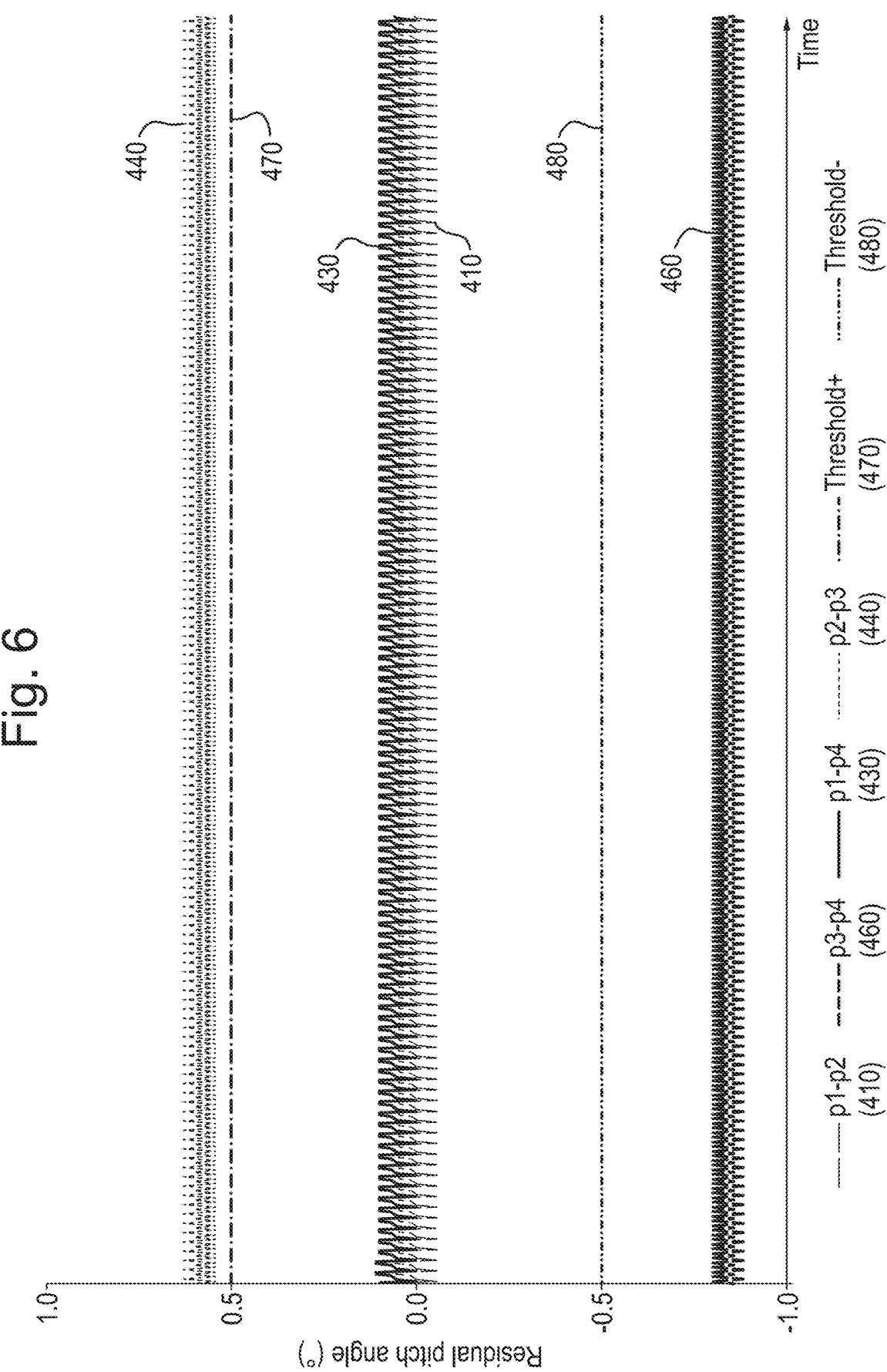
FIG. 6 shows experimental residual pitch angle data where three out of four propellers on an aircraft have minor damage and one propeller has more significant damage.

With reference to FIG. 6, the use of the term "relatively" above to describe the extent of damage to the propellers will now be explained in more detail. FIG. 6 depicts the residual pitch angles over time for the case where all four propellers are damaged. In particular, propellers P1, P2 and P4 all have one damaged blade, while propeller P3 has three damaged blades. In FIG. 6, residual pitch angle data set 410 shows residual pitch angle p1-p2 over time, residual pitch angle data set 430 shows residual pitch angle p1-p4 over time, data set 440 shows residual pitch angle p2-p3 over time and residual pitch angle data set 460 shows residual pitch angle p3-p4 over time. The upper threshold is given by 470 and the lower threshold by 480.

As can be seen, the residual pitch angle data sets 410 and 430 show residual pitch angles completely within the thresholds, i.e. between threshold 470 and threshold 480. It can be seen therefore from residual pitch angle data set 410 that propellers P1 and P2 are in a similar state of health, and from residual pitch angle data set 430 that propellers P1 and P4 are also in a similar state of health. However, it is clear from residual pitch angle data sets 440 and 460 which show residual pitch angles lying outside the thresholds 470 and 480 respectively that propellers P2 and P3 are in very different states of health, as are propellers P3 and P4. Thus, in conclusion from this data, propellers P1, P2 and P4 are in a similar state of health, while propeller P3 is in a different state of health.

Accordingly, it is not possible to definitely conclude whether only propeller P3 is damaged or if all of the propellers are damaged. In the data used for FIG. 6, in fact all of propellers P1, P2 and P4 had incurred damage to one blade, while propeller P3 had incurred damage to three blades. Thus propeller P3 was relatively more damaged that propellers P1, P2 and P4, which were all relatively similarly damaged.

It is clear from this that when using the method branch 120, the resultant determination of damage to propellers is only relative to the other propellers and thus, that for absolute certainty, either the method of branch 110 will need to be additionally applied, or visual inspection of the propellers will need to be carried out.

In any case, if it is concluded that a propeller or propellers are damaged, a control unit sends an alert for a visual inspection and maintenance to be carried out.

In all of the above embodiments, when calculating residual pitch angle, depending which pitch angle is subtracted from the other, the resultant residual pitch angle may be positive or negative. In any case, there is no need to be particular when choosing the order for subtraction, since the above methodology is not particularly concerned with whether the residual pitch angle is positive or negative, rather its amplitude. The reason for this is that depending on the particular damage to a propeller, the blades may readjust to compensate for the torque reacted (see description above) by changing the pitch angle in either direction of rotation. Accordingly, the important factor being assessed in the above methodology is the amplitude of the difference in pitch angle and not the direction of pitch change.

Given the above, it is also contemplated that a method could comprise calculating a residual pitch angle and subsequently taking the absolute value (i.e. the modulus) of this calculated residual pitch angle. These absolute values of residual pitch angle will range from 0° upwards. Accordingly, only one threshold, an upper threshold is required, e.g. at 0.5°.

In aircraft, the pitch angle of propellers is already measured using pre-existing hardware. Thus the present method and apparatus does not require additional measuring equipment, thereby providing a simple and weight-saving solution for monitoring aircraft health. Additionally, no extra instrumentation is required on rotating or static parts.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The invention claimed is:

1. A method for monitoring aircraft propeller health the method comprising:
   with a propeller controller, in response to a change in torque reacted by a blade of a first propeller of the aircraft, changing a pitch angle of all blades of the propeller in order to maintain a constant speed of rotation of the first propeller;
   receiving a first propeller pitch angle of the first propeller of an aircraft on a processing device, wherein pitch angle is an average pitch angle of all the blades of the propeller;
   calculating a first residual pitch angle which is the difference between the first propeller pitch angle and a second propeller pitch angle on the processing device;
   comparing, on the processing device, the first residual pitch angle to at least one threshold; and
   establishing, on the processing device, that the health of the propeller may be impaired if the first residual pitch angle is outside the at least one threshold.

2. The method of claim 1, wherein the at least one threshold includes upper and lower thresholds.

3. The method of claim 2, further comprising establishing that the health of the propeller may be impaired if the first residual pitch angle exceeds the upper threshold or is below the lower threshold.

4. The method of claim 2, further comprising:
   receiving propeller pitch angles of further propellers of the same aircraft;
   calculating further residual pitch angles which are the difference between pairs of propeller pitch angles;
   comparing the further residual pitch angles to the upper and lower thresholds; and
   establishing that the health of a propeller may be impaired if multiple residual pitch angles are outside of a range defined between the lower and upper thresholds, said residual pitch angles having been calculated using data from one or more common propellers.

5. The method of claim 4, further comprising indicating an alert for maintenance if it is established that the health of a propeller may be impaired.

6. The method of claim 1, wherein the second propeller pitch angle is a pitch angle of a second propeller of the aircraft, the method further comprising receiving the second propeller pitch angle.

7. The method of claim 1, wherein the second propeller pitch angle is a predicted pitch angle generated by a computer model, the method further comprising receiving the second propeller pitch angle.

8. The method of claim 7, further comprising:
receiving a third propeller pitch angle of a second propeller of the aircraft;
calculating a second residual pitch angle which is the difference between the first and third propeller pitch angles; and
comparing the second residual pitch angle to at least one threshold.

9. The method of claim 8, wherein comparing the second residual pitch angle to at least one threshold includes comparing the second residual pitch angle to upper and lower thresholds.

10. The method of claim 9, wherein the upper and lower thresholds for the second residual pitch angle are between +0.1° to +5° and between −0.1° to −5°, respectively.

11. The method of claim 9, wherein the upper and lower thresholds for the second residual pitch angle are between +0.3° to +1° and between −0.3° to −1°.

12. The method of claim 9, wherein the upper and lower thresholds for the second residual pitch angle are between +0.5° and −0.5° respectively.

13. The method of claim 1, wherein the at least one threshold for the first residual pitch angle is between 0.1° to 5°.

14. The method of claim 1, wherein the at least one threshold for the first residual pitch angle is between 0.2° to 2°.

15. The method of claim 1, wherein the at least one threshold for the first residual pitch angle is 0.5°.

16. The method of claim 1, further comprising establishing that the health of the propeller may be impaired if the first residual pitch angle is above the at least one threshold.

17. The method of claim 16, further comprising indicating an alert for maintenance if it is established that the health of the propeller may be impaired.

18. An apparatus comprising:
a system that, in response to a change in torque reacted by a blade of a first propeller of the aircraft, changes a pitch angle of all blades of the propeller in order to maintain a constant speed of rotation of the first propeller, the system comprising:
a processor configured to:
receive a first propeller pitch angle of the first propeller of an aircraft, wherein pitch angle is an average pitch angle of all the blades of the propeller;
calculate a first residual pitch angle which is the difference between the first propeller pitch angle and a second propeller pitch angle;
compare the first residual pitch angle to at least one threshold; and
establish that the health of the propeller may be impaired if the first residual pitch angle is outside the at least one threshold.

19. The apparatus as claimed in claim 18, wherein the processor is integrated into a Full Authority Digital Engine Control (FADEC).

20. The apparatus as claimed in claim 19, wherein the apparatus further comprises a propeller blade pitch angle detector.

* * * * *